Patented Dec. 30, 1947

2,433,658

UNITED STATES PATENT OFFICE 2,433,658

PROCESS FOR PRODUCING PHENOTHIAZINE

Lyle M. Geiger, Edgewood, and Charles N. Beck, Pittsburgh, Pa., assignors to The Neville Company, Pittsburgh 25, Pa., a corporation of Pennsylvania No Drawing. Application October 16, 1946, Serial No. 703,482

7 Claims. (Cl. 260—243)

The invention relates to an improved process for producing phenothiazine in high yield and of exceptional purity.

The conventional commercial specification for phenothiazine requires that it have a minimum melting point of 177° C., which corresponds to a purity of at least 95%.

It is the specific purpose and object of the present invention to provide a process for the direct production of a phenothiazine reaction product having a melting point not below 177° C., and requiring no subsequent distillation or purification steps.

It is well known that phenothiazine may be prepared by reacting sulfur with diphenylamine in accordance with the equation:

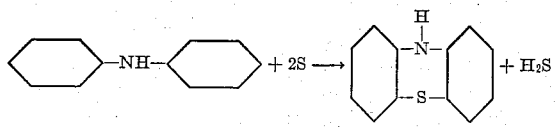

and that the reaction may be promoted by the presence of any of a number of condensation catalysts such as aluminum chloride, aluminum bromide, iodine, ferric chloride, antimony chloride, copper iodide, or sulfur iodide, etc.

The quantities reacted are usually those indicated in the above equation, namely 2 moles of sulfur per mole of diphenylamine. The quantity of the catalyst employed may vary somewhat, but generally speaking represents no more than about 3% by weight of the reactants employed. The reaction becomes appreciable, and is accompanied by evolution of hydrogen sulfide gas when temperatures of the order of about 120° to 130° C. are attained. The rate of reaction increases with further elevation in temperature. Temperatures of 180° to 200° C. have been found quite satisfactory.

In the prior art practice, it has been found impossible to directly produce from the condensation reaction a phenothiazine product meeting the above referred to minimum melting point and purity specifications. While the condensation reaction between sulfur and diphenylamine proceeds quite rapidly in the initial stages, it gradually slows down and when about 90% of the reactants have condensed, which may occur in from 15 to 20 minutes after the commencement of the reaction, the condensation appears to cease, with the result that the crude product is impure and will not meet the required specifications for a commercial product.

When higher temperatures are resorted to, the reaction rate can be increased. However, the yield of phenothiazine product is not increased, and furthermore the higher temperatures result in the production of tarry by-products at the expense of the desired phenothiazine. Additionally, when higher temperatures are employed, they not only result in an increased reaction velocity but give rise to an acceleration in the evolution of hydrogen sulfide gas which is accompanied by heavy foam formation, an extremely undesirable feature. Furthermore, the accelerated reaction velocity increases the sublimation of diphenylamine, bringing about an unbalance in the stoichiometric proportions of the reactants, which is undesirable.

When the reaction is attempted to be carried out at lower temperatures and completed by slowly raising the temperature, substantial amounts of impurities of a tarry or resinous nature are formed as a result of the long reaction time, which may extend over a period of from 8 to 12 hours in an effort to obtain a product of the required melting point and purity.

Due to these inherent difficulties in the prior art procedures for reacting sulfur with diphenylamine, various proposals have been advanced for improving the yield of phenothiazine and for speeding up the reaction without undesirable foam formation or the production of unwanted tarry byproducts.

It has heretofore been proposed to use an appreciable excess, of the order of 30 to 50%, of diphenylamine in carrying out the sulfur-diphenylamine condensation reaction for the purpose of decreasing unwanted byproduct formation. This procedure, however, presents serious disadvantages since, due to the presence of as much as 50% excess diphenylamine in the reaction, the yield per operational unit is very greatly decreased. Furthermore, the unreacted diphenylamine must be separated from the reaction product which entails procedural steps that render the process uneconomical.

It has also been proposed to initially heat one of the reactants, usually the diphenylamine, together with the catalyst to a temperature of the order of 160° to 165° C., and to then add the liquefied sulfur gradually, over a period of several hours, after which the reaction is completed by further heating the reaction mixture to a higher temperature for a considerably longer period of time. This latter procedure has permitted the obtaining of a fairly pure product. However, the process thus conducted requires a time period of 10 to 12 hours for completion. Pursuant to this method, only two batches can be produced per operational unit for each 24 hour day.

It has also been proposed to purify the crude, initially formed, phenothiazine product, which as indicated has only approximately 90% purity, by distillation over an alkali. A further suggested variation of the prior art entails the purification of the crude phenothiazine product by distilling the same over finely divided metals such as aluminum, copper, and zinc. These latter proposals represent uneconomical attempts to purify the admittedly impure, initially produced phenothiazine product.

None of the prior art methods has provided a rapid and economical single step procedure for the direct production of phenothiazine having a minimum melting point of 177° C. corresponding to a minimum purity of at least 95%.

By the process of the present invention, it is possible in a single step procedure to rapidly produce phenothiazine in high yield and having a minimum melting point not below 177° C.

As hereinbefore pointed out, it is possible to obtain phenothiazine of approximately 90% purity in a time period of only 15 to 20 minutes. However, many hours have heretofore been required to obtained a product of 95% purity. It is possible by the process of the present invention to obtain a purity of around 97% or above in a total reaction time not substantially exceeding one-half hour after the reactants have attained a reaction temperature.

In accordance with the present invention, these results are attained by passing a stream of a gas, inert under the reaction conditions, through the molten reaction mixture while the same is maintained at a temperature of from 180° to 220° C.

The gas employed in carrying out the process of the present invention must be one that is inert under the conditions prevailing during the condensation reaction. Carbon dioxide gas, nitrogen gas, air and steam have all been successfully employed in carrying out the process.

The following examples are illustrative of the process and clearly indicate that comparatively high yields of phenothiazine meeting conventional commercial specification requirements can be produced employing reaction time periods not in excess of 30 minutes.

*Example I*

A heated vessel A, which was equipped with a mechanical stirrer, was slowly charged with premixed materials, i. e. 423 parts of diphenylamine, 160 parts of sulfur, and 2.4 parts of iodine. The charge was readily melted and the slurry raised to a temperature between 95° and 105° C. and allowed to flow by gravity into a second heated vessel B, which was closed except for a hydrogen sulfide gas take-off line. The vessel B was likewise equipped with a mechanical stirrer. The reaction mixture was rapidly heated in vessel B to a temperature of 180° C., at which time there was introduced into the bottom of the molten mass to rise therethrough a stream of carbon dioxide gas. With continued heating of the vessel B, the temperature rose in approximately 15 minutes to about 203° C., at which time the sample of the phenothiazine condensation product taken from the vessel B had a capillary tube melting point of 179° C. The product was poured directly from the vessel B into cooling pans, and 501 parts of pale olive green phenothiazine was recovered.

*Example II*

The quantities of reactants and catalyst were the same in this example as in Example I, and the procedure followed was the same except that, when the molten reaction mixture in vessel B attained a temperature of 185° C., a stream of nitrogen gas was introduced to pass through the reaction mixture, and the flow of the nitrogen gas through the reaction mixture was continued for 20 minutes, during which time the temperature was allowed to rise to about 220° C., at which point a sample of the phenothiazine product taken from vessel B had a capillary tube melting point of 180° C. The product was poured directly into cooling pans and 498 parts of phenothiazine were recovered.

*Example III*

The procedure for this example differed from that of Example I in that when the molten reaction mixture attained a temperature of 190° C. in vessel B, a first sample was taken therefrom, following which air was blown through the molten reaction mixture in vessel B for an additional 15 minutes, during which the temperature was allowed to rise to about 200° C., at which time a second sample was taken. The first sample had a capillary tube melting point of only 170° C., whereas the second sample displayed a capillary melting point of about 178° C. The phenothiazine produced was poured from vessel B into cooling pans and 502 parts thereof recovered.

*Example IV*

The procedure in this example paralleled that of Example I, except that superheated steam constituted the gas employed, and was introduced into vessel B when the reaction mixture therein attained the temperature of about 188° C. The steam was introduced for a period of 15 minutes, during which the temperature was permitted to rise to about 206° C., at which point a sample of the phenothiazine condensation product had a capillary tube melting point of 179° C. The phenothiazine formed was directly poured from vessel B into cooling pans, and 497 parts thereof were recovered.

In all of the foregoing examples, the total time consumed for completion of the reaction in each example did not exceed 30 minutes, whereas prior art procedures often entail 10 and 12 hour reaction periods without the attainment of a product having the required minimum melting point of 177° C.

It is at once apparent that through the process of the present invention the production of phenothiazine is very materially speeded up. In actual practice, employing a one hundred gallon reactor and following the procedure of the present invention outlined herein, a yield of 6,000 pounds of phenothiazine in a 24 hour period having a purity of approximately 97% has been obtained. The same equipment, following the prior art procedures, can produce a maximum of only 1,500 pounds of phenothiazine, and the product does not have a purity above 95%.

The rate of flow of the inert gas through the reaction mixture does not appear to be particularly critical. However, it has been found that at least 2 cubic feet per minute should be passed through a hundred gallon reaction mixture. Too great an excess of inert gas should not be employed since it does not materially assist the reaction, and furthermore operates to undesirably cool the reaction mixture.

While it is not desired to limit the teaching of the present invention to any particular theory, it is believed that the advantages of the invention may be explained as follows:

The reaction between diphenylamine and sulfur is thought to be an equilibrium reaction and that phenothiazine produced may react with hydrogen sulfide present to re-form diphenylamine and sulfur. It is appreciated that at the temperature of the reaction the equilibrium definitely favors the formation of phenothiazine. However, this product is never formed quantitatively so long as hydrogen sulfide is present. Furthermore, hydrogen sulfide is extremely soluble in the reaction mixture, and therefore prevents the reaction going to completion. It is, therefore, necessary to wait until all hydrogen sulfide has disappeared from the reaction mixture to ensure that the reaction has been in any wise completed. This requires a long time period and occasions side reactions which yield unwanted byproducts.

The inert gas passed through the molten reaction mixture pursuant to the present invention acts to remove hydrogen sulfide and prevent dissolution thereof in the reaction mixture, thus precluding the re-formation of diphenylamine and sulfur. In this way, the reaction can be quickly carried to completion with resultant production of virtually pure phenothiazine. Furthermore, because of the exceedingly short duration of the reaction, no substantial opportunity is afforded for side reactions to occur, and accordingly no unwanted byproducts are produced.

The mixture of reaction components is generally rapidly heated until the condensation reaction starts, as witnessed by hydrogen sulfide evolution. In our preferred procedure the initial melting of the components of the reaction mixture is effected at temperatures not substantially above 110° C. The temperature of the reaction mixture should be maintained within the range of 180° to 220° C. during the time that the inert gas is passed therethrough. This range of temperature should not be substantially exceeded since higher temperatures frequently lead to the occurrence of undesirable side reactions. It is both economical and advantageous to initiate the inert gas introduction to the reaction mixture after the initial hydrogen sulfide gas evolution has substantially subsided.

What is claimed is:

1. A method for producing phenothiazine comprising reacting a molten mixture of sulfur and diphenylamine in the presence of a condensing catalyst for the reaction in a reaction zone, passing an inert gas through the molten reaction mixture to rapidly conclude the condensation reaction and to increase the yield and purity of the reaction product, while avoiding any substantial distillation of phenothiazine, and then withdrawing the resulting purified phenothiazine from the reaction zone.

2. A method of producing phenothiazine comprising reacting a molten mixture of sulfur and diphenylamine in the presence of a condensing catalyst for the reaction, passing an inert gas through the molten reaction mixture to rapidly conclude the condensation reaction and to increase the yield and purity of the reaction product, while maintaining said reaction mixture at a temperature and pressure which prevent any substantial vaporization of phenothiazine, and then recovering the resulting phenothiazine.

3. A method for producing phenothiazine comprising reacting a molten mixture of sulfur and diphenylamine in the presence of a condensing catalyst for the reaction, passing a gas, inert under the reaction conditions, through the molten reaction mixture at such a rate under reaction conditions as to rapidly conclude the condensation reaction and to increase the yield and purity of the reaction product, while avoiding any substantial distillation of phenothiazine, and then withdrawing the resulting purified phenothiazine.

4. A method for producing phenothiazine comprising reacting a molten mixture of sulfur and diphenylamine in the presence of a condensing catalyst for the reaction, passing a gas, inert under the reaction conditions, through the molten reaction mixture at such a rate under reaction conditions for a time period of at least about 15 minutes to rapidly conclude the condensation reaction and to increase the yield and purity of the reaction product, while avoiding any substantial distillation of phenothiazine, and then withdrawing the resulting purified phenothiazine.

5. A process for directly producing phenothiazine having a melting point not below 177° C. comprising reacting sulfur with diphenylamine in the presence of a condensing catalyst for the reaction, heating the reaction mixture to a temperature of at least about 180° C., and passing a gas, inert under the reaction conditions, through the molten reaction mixture for a time period of at least about 15 minutes, while maintaining said reaction mixture at a temperature and pressure which prevent any substantial vaporization of phenothiazine, and then recovering the thus purified phenothiazine.

6. A process for producing phenothiazine having a melting point not below 177° C., comprising mixing diphenylamine, sulfur, and a condensing catalyst, heating the reaction mixture to a point at which substantial evolution of hydrogen sulfide occurs, and thereafter, when said hydrogen sulfide evolution has substantially subsided, passing a gas, inert under the reaction conditions, through the molten reaction mixture, while maintaining said reaction mixture at a temperature and pressure which prevent any substantial vaporization of phenothiazine, and withdrawing the thus purified phenothiazine.

7. A process for producing phenothiazine having a melting point not below 177° C., comprising mixing diphenylamine, sulfur, and a condensing catalyst, heating the reaction mixture to a point at which substantial evolution of hydrogen sulfide occurs, and thereafter, when said hydrogen sulfide evolution has substantially subsided, passing nitrogen through the molten reaction mixture while at a temperature not substantially above 220° C. to rapidly conclude the condensation reaction and to increase the yield and purity of the reaction product, and thereafter recovering the thus purified phenothiazine.

LYLE M. GEIGER.
CHARLES N. BECK.

REFERENCES CITED

The following references are of record in the file of this patent:

UNITED STATES PATENTS

| Number | Name | Date |
|---|---|---|
| 2,415,363 | Mitchell et al. | Feb. 4, 1947 |